US011242464B2

(12) United States Patent
Tziovaras et al.

(10) Patent No.: US 11,242,464 B2
(45) Date of Patent: Feb. 8, 2022

(54) METHOD FOR THE PARTIAL COLOURING OF PLASTIC PARTS

(71) Applicant: Covestro Deutschland AG, Leverkusen (DE)

(72) Inventors: Georgios Tziovaras, Neuss (DE); Ciro Piermatteo, Leverkusen (DE); Heinz Pudleiner, Krefeld (DE); Kira Planken, Goch (DE); Stefan Janke, Brüggen (DE)

(73) Assignee: Covestro Deutschland AG, Leverkusen (DE)

( * ) Notice: Subject to any disclaimer, the term of this patent is extended or adjusted under 35 U.S.C. 154(b) by 130 days.

(21) Appl. No.: 16/624,350

(22) PCT Filed: Jun. 22, 2018

(86) PCT No.: PCT/EP2018/066731
§ 371 (c)(1),
(2) Date: Dec. 19, 2019

(87) PCT Pub. No.: WO2019/002118
PCT Pub. Date: Jan. 3, 2019

(65) Prior Publication Data
US 2021/0147697 A1     May 20, 2021

(30) Foreign Application Priority Data

Jun. 28, 2017 (EP) ..................... 17178250
Jul. 5, 2017 (LU) .................. LU100327

(51) Int. Cl.
| C09D 7/63 | (2018.01) |
| B42D 25/382 | (2014.01) |
| B42D 25/435 | (2014.01) |
| C09D 7/61 | (2018.01) |
| C08J 7/06 | (2006.01) |
| B42D 25/23 | (2014.01) |

(52) U.S. Cl.
CPC ............ *C09D 7/63* (2018.01); *B42D 25/382* (2014.10); *B42D 25/435* (2014.10); *C08J 7/065* (2013.01); *C09D 7/61* (2018.01); *B42D 25/23* (2014.10); *C08J 2369/00* (2013.01)

(58) Field of Classification Search
CPC .......... C09D 7/63; C09D 7/61; B42D 25/382; B42D 25/435; B42D 25/23; B42D 25/41; B42D 25/36; C08J 7/065; C08J 2369/00; C08J 7/06; B41M 5/267; B41M 3/14; B41M 5/26
USPC ................. 283/67, 70, 72, 91, 94, 98, 114
See application file for complete search history.

(56) References Cited

U.S. PATENT DOCUMENTS

| 3,692,744 | A | 9/1972 | Rich et al. |
| 4,176,224 | A | 11/1979 | Bier et al. |
| 4,368,240 | A | 1/1983 | Nauta et al. |
| 4,982,014 | A | 1/1991 | Freitag et al. |
| 5,733,651 | A | 3/1998 | Wank et al. |
| 7,771,646 | B2 | 8/2010 | Clauss et al. |
| 9,079,443 | B2 | 7/2015 | Pudleiner et al. |
| 10,131,178 | B2 | 11/2018 | Pudleiner et al. |
| 2009/0059369 | A1* | 3/2009 | Otome ............... G02B 5/208 359/489.2 |
| 2010/0304093 | A1 | 12/2010 | Hagemann et al. |
| 2019/0106837 | A1 | 4/2019 | Tziovaras et al. |

FOREIGN PATENT DOCUMENTS

| CN | 103608184 A | 2/2014 |
| CN | 103781632 A | 5/2014 |
| CN | 104995247 A | 10/2015 |
| CN | 110785288 A | 2/2020 |
| DE | 1561518 A | 3/1969 |
| DE | 1900270 A1 | 11/1969 |
| DE | 2407674 A1 | 10/1974 |
| DE | 2407776 A1 | 9/1975 |
| DE | 2715932 A1 | 10/1978 |
| DE | 3832396 A1 | 2/1990 |
| DE | 102008002989 A1 | 2/2009 |
| EP | 0359953 A1 | 3/1990 |
| EP | 0691201 A2 | 1/1996 |
| EP | 1801815 A1 | 6/2007 |
| EP | 2050866 A2 | 4/2009 |
| EP | 2179857 A1 | 4/2010 |
| EP | 2752302 A2 | 7/2014 |
| EP | 3436284 A1 | 2/2019 |
| GB | 1229482 A | 4/1971 |
| GB | 1464449 A | 2/1977 |
| GN | 101472745 A | 7/2009 |
| GN | 101613963 A | 12/2009 |

(Continued)

OTHER PUBLICATIONS

International Search Report for PCT/EP2018/066731 dated Jul. 17, 2018.

(Continued)

*Primary Examiner* — Justin V Lewis

(74) *Attorney, Agent, or Firm* — Faegre Drinker Biddle & Reath LLP

(57) ABSTRACT

The present invention relates to an improved method for the partial colouring, in particular for the coloured laser engraving, of plastic parts, in particular thermoplastic plastic parts, more particularly thermoplastic plastic parts, comprising a layer structure, and to the resulting partially coloured, preferably coloured and laser engraved, plastic parts, in particular thermoplastic plastic parts.

16 Claims, No Drawings

(56) References Cited

FOREIGN PATENT DOCUMENTS

| | | |
|---|---|---|
| GN | 102196920 A | 9/2011 |
| JP | 2008214596 A | 9/2008 |
| JP | 2012011688 A | 1/2012 |
| JP | 2012011689 A | 1/2012 |
| WO | WO-03040461 A1 | 5/2003 |
| WO | WO-2003056507 A1 | 7/2003 |
| WO | WO-03083207 A1 | 10/2003 |
| WO | WO-2004050766 A1 | 6/2004 |
| WO | WO-2004050767 A1 | 6/2004 |
| WO | WO-2005033218 A1 | 4/2005 |
| WO | WO-2006042714 A1 | 4/2006 |
| WO | WO-2009071068 A2 | 6/2009 |
| WO | WO-2010046042 A1 | 4/2010 |
| WO | WO-2010089035 A1 | 8/2010 |
| WO | WO-2012076354 A2 | 6/2012 |
| WO | WO-2012076406 A1 | 6/2012 |
| WO | 2013/037672 A1 | 3/2013 |
| WO | WO-2014057039 A1 | 4/2014 |
| WO | WO-2017167651 A1 | 10/2017 |

OTHER PUBLICATIONS

Written Opinion of the International Searching Authority for PCT/EP2018/066731 dated Jul. 17, 2018.

\* cited by examiner

METHOD FOR THE PARTIAL COLOURING OF PLASTIC PARTS

CROSS-REFERENCE TO RELATED APPLICATIONS

This application is a national stage application (under 35 U.S.C. § 371) of PCT/EP2018/066731, filed Jun. 22, 2018, which claims benefit of European Application No. 17178250.1, filed Jun. 28, 2017 and Luxembourg Application No. LU100327, filed Jul. 5, 2017, all of which are incorporated herein by reference in their entirety.

The present invention relates to an improved process for partial coloring, in particular for color laser engraving, of plastic parts, in particular thermoplastic plastic parts, very particularly thermoplastic plastic parts comprising a layer construction, and to the resulting partially colored, preferably color laser engraved plastic parts, in particular thermoplastic plastic parts, very particularly thermoplastic plastic parts comprising a layer construction.

The option of color laser engraving plastic parts is of interest for the entire plastic parts manufacturing industry. Of interest here is colored laser engraving of three-dimensionally formed plastic parts, for example for the automotive industry. Thus for example switches, trim pieces etc. may be engraved with colored symbols. Plastic parts comprising a lacquer for surface protection thereof may also be color laser engraved. The laser beam removes the lacquer layer and the dye simultaneously migrates into the plastic surface at this site. Unprotected plastic surfaces may also be color laser engraved and subsequently lacquered to ensure an uninterrupted shiny appearance of the plastic parts and provide protection against scratches and chemical damage. Such colored symbols have hitherto been producable for example by plastic injection molding with a plurality of colored components in the first manufacturing step. In a second manufacturing step the plastic parts must be lacquered with a covering ink. In a third manufacturing step the color layer must be laser engraved to reveal the plastic surface therebelow. A protective lacquer may optionally be applied in a fourth manufacturing step.

Alternatively, transparent plastic films may be color engraved on their reverse and subsequently subjected to film insert molding with a thermoplastic to obtain surfaces which are shiny or have a uniform appearance. This process is described for example in EP-A 0691201 example 1.

In the security and/or high-value document industry, in particular identification documents (ID documents), there is the need for colored personalization of these documents by means of lasers. The personalization of identification documents (ID documents) consisting partially or completely of polymer films by the laser engraving process is prior art. However, the processes known hitherto generate only images and texts in various shades of gray in the documents. Colored elements cannot be generated by laser engraving. Only in combination with color layers previously applied by printing techniques which are subsequently altered by means of lasers is it possible to generate colored images in or on such security and/or high-value documents.

Recent years have seen the development, especially in the field of security and/or high-value documents, in particular ID documents, of processes that make it possible to generate colored elements in these documents that are entirely or partially constructed from polymer films. However, these processes are associated with considerable technical complexity. All processes include a printing process to realize the coloring.

WO-A 03/056507 discloses a process in which a colored image may be formed by laser engraving as follows: A film on whose surface a colored image is later to be formed is printed over its entire area with an ink which reacts with a certain wavelength of laser light. The reaction manifests in the bleaching of the color pigments as soon as these are exposed by the laser. If three types of pigments, for example red, yellow, blue, reacting at three different wavelengths are used it is possible to generate full-color images through corresponding bleaching of the pigments at the laser-irradiated sites. However, this process is particularly complex since three different laser sources must be used and the ink must be printed onto the surface over its entire area. This has the result that the composite adhesion of the films after lamination is insufficient in the region of the image.

A further process is disclosed in EP-A 2752302 and is based on the principle of a color display: Narrow lines are printed onto films in the base colors red, yellow, blue. These lines are then selectively blackened using lasers to allow the impression of a color image to be formed. This process is also complex since very precise printing is required in advance to allow the image to be formed. In addition, the resolution of the image is very coarse since it is not possible to achieve a distance between the lines of less than about 80 µm and the images appear dark since a large part of the image area is blackened by the laser.

JP-A 2012-011688 describes printing of films by inkjet as a further process. The printed motifs are printed onto the film in conventional fashion using an inkjet printer and the ink is fixed by lasers. This process is comparable to the widespread UV-curable ink system. It differs only in that a laser is used to fix the inks instead of UV light. In this process the ink remains on the plastic surface. This process is in particular not suitable for the engraving of security documents since the inks can be removed from the plastic surface.

JP-A 2012-011689 discloses a method and an apparatus for color laser printing on moldings without damaging the substrate. In this process the ink is applied to the molding by inkjet and then this ink is fixed on the molding using a laser beam.

EP-A 2179857 discloses layer constructions for ID cards writable by laser engraving which have an additional layer that is applied to the card body after laser engraving and thus limits or completely prevents subsequent writing of the card by laser engraving and thus the falsification of the information present. Color laser engraving is not disclosed.

WO-A 2005/033218 discloses a lacquer composition containing iron blue pigment which is suitable for producing a laser engravable lacquer layer which may be residuelessly laser engraved using a laser. Laser engraving removes the lacquer layer in order thus to apply the relevant information.

EP application number 16162536.3 discloses a process for partial coloring, in particular for color laser engraving, of plastic parts, in particular thermoplastic plastic parts, very particularly of plastic films. However, a disadvantage of this process is the intensity of the color laser engraving on the plastic parts.

The present invention accordingly has for its object to provide an improved and simple process for partial coloring, in particular for color laser engraving, of plastic parts, preferably of thermoplastic plastic parts, very particularly of thermoplastic plastic parts comprising a layer construction such as for example plastic films and/or film layer composites.

This object was surprisingly achieved by the process according to the invention for partial coloring, in particular color laser engraving, of plastic parts, in particular thermoplastic plastic parts, very particularly of thermoplastic plastic parts comprising a layer construction, containing the steps of
  i) immersing a plastic part in a coloring bath,
  ii) optionally heating the coloring bath,
  iii) irradiating the plastic part from i) and optionally ii)
    with focused nonionizing electromagnetic radiation,
wherein the partial coloring is effected substantially only at the sites irradiated in step iii); wherein the wavelength range of the focused nonionizing electromagnetic radiation is chosen such that the coloring bath has a light permeability of ≥10% to ≤99%, preferably of ≥30% to ≤95%, particularly preferably ≥40% to ≤93%, determined according to ISO 13468-2; wherein the plastic part comprises at least one additive which has an absorption maximum in the wavelength range of the employed focused nonionizing electromagnetic radiation or wherein the plastic part is coated with at least one additive in the form of a coating composition which has an absorption maximum in the wavelength range of the employed focused nonionizing electromagnetic radiation.

In the context of the present invention "substantially" is to be understood as meaning that a colored element which is clearly apparent to the naked eye as a visible colored element is formed only at the sites irradiated in step iii). This does not preclude the possibility that a slight coloring of the plastic part at the nonirradiated sites may occur.

The process according to the invention has the feature that a partial coloring of the plastic part, in particular of the thermoplastic plastic part, very particularly of the thermoplastic plastic part comprising a layer construction, occurs substantially at the sites irradiated in step iii). The remainder of the plastic part exhibits only very weak coloring, if any, at the nonirradiated regions. It is thus possible to color specific regions of the plastic part in order to apply to this plastic part by the process according to the invention for example an image, personalization, logo, symbol or script. These are not readily removable from the plastic surface. The process according to the invention is thus suitable in particular for the field of producing security and identification documents.

Especially upon irradiation with laser radiation these colored elements achieve particularly high resolutions of 5000 dpi and in some cases even higher. The process according to the invention requires neither a high-precision printing technique nor the use of different laser strengths provided the irradiation in step iii) is carried out with laser radiation. In addition the process according to the invention is suitable for the application of colored elements both onto three-dimensional plastic parts and onto thermoplastic plastic parts comprising a layer construction containing one or more layers of a thermoplastic plastic.

In an alternative embodiment of the process according to the invention a black and white coloring may additionally be applied to the plastic part before or after the partial colored coloring according to the steps i) to iii) of the process according to the invention. In this embodiment of the invention the steps i) to iii) are preceded or followed by an irradiation with focused nonionizing electromagnetic radiation as in step iii) in the absence of the coloring bath.

The process according to the invention may a multiplicity of plastic parts, in particular thermoplastic plastic parts, very particularly thermoplastic plastic parts comprising a layer construction, wherein the layer construction may comprise at least one layer of a thermoplastic plastic containing at least one additive which has an absorption maximum in the wavelength range of the employed focused nonionizing electromagnetic radiation and wherein this at least one layer of a thermoplastic plastic has a light permeability of ≥10% to ≤99%, preferably of ≥30% to ≤95%, particularly preferably ≥40% to ≤93%, determined according to ISO 13468-2.

The preferably thermoplastic plastic parts may particularly preferably be a thermoplastic plastic selected from polymers of ethylenically unsaturated monomers and/or polycondensates of bifunctional reactive compounds and/or polyaddition products of bifunctional reactive compounds.

Particularly suitable thermoplastic plastics are one or more polycarbonate(s) or copolycarbonate(s) based on diphenols, poly- or copolyacrylate(s) and poly- or copolymethacrylate(s) such as, by way of example and preferably, polymethylmethacrylate or poly(meth)acrylate (PMMA), polymer(s) or copolymer(s) with styrene such as, by way of example and preferably, polystyrene (PS), acrylonitrile-butadiene-styrene (ABS), or polystyrene-acrylonitrile (SAN), thermoplastic polyurethane(s) and also polyolefin(s) such as, by way of example and preferably, polypropylene types or polyolefins based on cyclic olefins (e.g. TOPAS™, Hoechst), poly- or copolycondensate(s) of terephthalic acid such as, by way of example and preferably, poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), polyamide (PA), poly- or copolycondensate(s) of naphthalenedicarboxylic acid such as, by way of example and preferably, polyethylene glycol naphthalate (PEN), poly- or copolycondensate(s) of at least one cycloalkyldicarboxylic acid such as, by way of example and preferably, polycyclohexanedimethanolcyclohexanedicarboxylic acid (PCCD), polysulfones (PSU), mixtures of the aforementioned or blends thereof.

Particularly preferred thermoplastic plastics are one or more polycarbonate(s) or copolycarbonate(s) based on diphenols or blends comprising at least one polycarbonate or copolycarbonate. Very particular preference is given to blends comprising at least one polycarbonate or copolycarbonate and at least one poly- or copolycondensate of terephthalic acid, of naphthalenedicarboxylic acid or of a cycloalkyldicarboxylic acid, preferably of cyclohexanedicarboxylic acid. Very particular preference is given to polycarbonates or copolycarbonates, especially having average molecular weights Mw of 500 to 100 000, preferably of 10 000 to 80 000, particularly preferably of 15 000 to 40 000, or blends thereof with at least one poly- or copolycondensate of terephthalic acid having average molecular weights Mw of 10 000 to 200 000, preferably of 21000 to 120 000.

Suitable poly- or copolycondensates of terephthalic acid in preferred embodiments of the invention are polyalkylene terephthalates. Suitable polyalkylene terephthalates are for example reaction products of aromatic dicarboxylic acids or the reactive derivatives thereof (e.g. dimethyl esters or anhydrides) and aliphatic, cycloaliphatic or araliphatic diols, and mixtures of these reaction products.

Preferred polyalkylene terephthalates may be prepared from terephthalic acid (or reactive derivatives thereof) and aliphatic or cycloaliphatic diols having 2 to 10 C atoms by known methods (Kunststoff-Handbuch, vol. VIII, pg. 695 ff, Karl-Hanser-Verlag, Munich 1973).

Preferred polyalkylene terephthalates contain at least 80 mol %, preferably 90 mol % of terephthalic acid radicals, based on the dicarboxylic acid component, and at least 80 mol %, preferably at least 90 mol % of ethylene glycol and/or butane-1,4-diol and/or cyclohexane-1,4-dimethanol radicals, based on the diol component.

The preferred polyalkylene terephthalates may contain, in addition to terephthalic acid radicals, up to 20 mol % of radicals of other aromatic dicarboxylic acids having 8 to 14 carbon atoms or of aliphatic dicarboxylic acids having 4 to 12 carbon atoms, such as for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may contain, in addition to ethylene and/or butane-1,4-diol glycol radicals, up to 80 mol % of other aliphatic diols having 3 to 12 carbon atoms or of cycloaliphatic diols having 6 to 21 carbon atoms, for example radicals of propane-1,3-diol, 2-ethylpropane-1,3-diol, neopentyl glycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3-diol and 2-ethylhexane-1,6-diol, 2,2-diethylpropane-1,3-diol, hexane-2,5-diol, 1,4-di([beta]-hydroxyethoxy)benzene, 2,2-bis(4-hydroxycyclohexyl)propane, 2,4-dihydroxy-1,1,3,3-tetramethylcyclobutane, 2,2-bis(3-[beta]-hydroxyethoxyphenyl)propane and 2,2-bis(4-hydroxypropoxyphenyl)propane (cf. DE-OS 24 07 674, 24 07 776, 27 15 932).

The polyalkylene terephthalates may be branched by incorporation of relatively small amounts of tri- or tetrahydric alcohols or tri- or tetrabasic carboxylic acids, as described for example in DE-OS 19 00 270 and U.S. Pat. No. 3,692,744. Examples of preferred branching agents are trimesic acid, trimellitic acid, trimethylolethane and trimethylolpropane and pentaerythritol.

Preferably, not more than 1 mol % of the branching agent is used, based on the acid component.

Particular preference is given to polyalkylene terephthalates which have been prepared solely from terephthalic acid and the reactive derivatives thereof (e.g. the dialkyl esters thereof) and ethylene glycol and/or butane-1,4-diol and/or cyclohexane-1,4-dimethanol radicals, and to mixtures of these polyalkylene terephthalates.

Preferred polyalkylene terephthalates are also copolyesters prepared from at least two of the abovementioned acid components and/or from at least two of the abovementioned alcohol components; particularly preferred copolyesters are poly(ethylene glycol/butane-1,4-diol) terephthalates.

The polyalkylene terephthalates used with preference as component preferably have an intrinsic viscosity of about 0.4 to 1.5 dl/g, preferably 0.5 to 1.3 dl/g, measured in each case in phenol/o-dichlorobenzene (1:1 parts by weight) at 25° C.

In particularly preferred embodiments of the invention, the blend of at least one polycarbonate or copolycarbonate with at least one poly- or copolycondensate of terephthalic acid is a blend of at least one polycarbonate or copolycarbonate with poly- or copolybutylene terephthalate or glycol-modified poly- or copolycyclohexanedimethylene terephthalate. Such a blend of polycarbonate or copolycarbonate with poly- or copolybutylene terephthalate or glycol-modified poly- or copolycyclohexanedimethylene terephthalate may preferably be one having 1% to 90% by weight of polycarbonate or copolycarbonate and 99% to 10% by weight of poly- or copolybutylene terephthalate or glycol-modified poly- or copolycyclohexanedimethylene terephthalate, preferably having 1% to 90% by weight of polycarbonate and 99% to 10% by weight of polybutylene terephthalate or glycol-modified polycyclohexanedimethylene terephthalate, where the proportions add up to 100% by weight. Particularly preferably, such a blend of polycarbonate or copolycarbonate with poly- or copolybutylene terephthalate or glycol-modified poly- or copolycyclohexanedimethylene terephthalate may be one having 20% to 85% by weight of polycarbonate or copolycarbonate and 80% to 15% by weight of poly- or copolybutylene terephthalate or glycol-modified poly- or copolycyclohexanedimethylene terephthalate, preferably having 20% to 85% by weight of polycarbonate and 80% to 15% by weight of polybutylene terephthalate or glycol-modified polycyclohexanedimethylene terephthalate, where the proportions add up to 100% by weight. Very particularly preferably, such a blend of polycarbonate or copolycarbonate with poly- or copolybutylene terephthalate or glycol-modified poly- or copolycyclohexanedimethylene terephthalate may be one having 35% to 80% by weight of polycarbonate or copolycarbonate and 65% to 20% by weight of poly- or copolybutylene terephthalate or glycol-modified poly- or copolycyclohexanedimethylene terephthalate, preferably having 35% to 80% by weight of polycarbonate and 65% to 20% by weight of polybutylene terephthalate or glycol-modified polycyclohexanedimethylene terephthalate, where the proportions add up to 100% by weight. In very particularly preferred embodiments, these may be blends of polycarbonate and glycol-modified polycyclohexanedimethylene terephthalate in the compositions mentioned above.

Suitable polycarbonates or copolycarbonates in preferred embodiments are particularly aromatic polycarbonates or copolycarbonates.

The polycarbonates or copolycarbonates may be linear or branched in known fashion.

These polycarbonates may be prepared in known fashion from diphenols, carbonic acid derivatives, optionally chain terminators and optionally branching agents. Particulars pertaining to the production of polycarbonates are disclosed in many patent documents spanning approximately the last 40 years. Reference is made here merely by way of example to Schnell, "Chemistry and Physics of Polycarbonates", Polymer Reviews, volume 9, interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, volume 11, second edition, 1988, pages 648-718 and finally to Dres. U. Grigo, K. Kirchner and P. R. Müller, "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117-299.

Suitable diphenols may, for example, be dihydroxyaryl compounds of the general formula (I),

$$HO-Z-OH \qquad (I)$$

in which Z is an aromatic radical which has 6 to 34 carbon atoms and may contain one or more optionally substituted aromatic rings and aliphatic or cycloaliphatic radicals or alkylaryls or heteroatoms as bridging elements.

Examples of suitable dihydroxyaryl compounds are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulphides, bis(hydroxyphenyl) sulphones, bis(hydroxyphenyl) sulphoxides, 1,1'-bis(hydroxyphenyl)diisopropylbenzenes and the ring-alkylated and ring-halogenated compounds thereof.

These and further suitable other dihydroxyaryl compounds are described, for example, in DE-A 3 832 396, FR-A 1 561 518, in H. Schnell, Chemistry and Physics of Polycarbonates, Interscience Publishers, New York 1964, p. 28 ff.; p. 102 ff., and in D. G. Legrand, J. T. Bendler, Handbook of Polycarbonate Science and Technology, Marcel Dekker New York 2000, p. 72 ff.

Preferred dihydroxyaryl compounds are, for example, resorcinol, 4,4'-dihydroxydiphenyl, bis(4-hydroxyphenyl) methane, bis(3,5-dimethyl-4-hydroxyphenyl)methane, bis (4-hydroxyphenyl)diphenylmethane, 1,1-bis(4-hydroxyphenyl)-1-phenylethane, 1,1-bis(4-hydroxyphenyl)-1-(1-naphthyl)ethane, 1,1-bis(4-hydroxyphenyl)-1-(2-naphthyl)ethane, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(4-hydroxyphenyl)-1-phenylpropane, 2,2-bis(4-hydroxyphenyl)hexafluoropropane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane. 1,1-bis(3,5-dimethyl-4-hydroxyphenyl)cyclohexane, 1,1-bis(4-hydroxyphenyl)-4-methylcyclohexane, 1,3-bis[2-(4-hydroxyphenyl)-2-propyl]benzene, 1,1'-bis(4-hydroxyphenyl)-3-diisopropylbenzene, 1,1'-bis(4-hydroxyphenyl)-4-diisopropylbenzene, 1,3-bis[2-(3,5-dimethyl-4-hydroxyphenyl)-2-propyl]benzene, bis(4-hydroxyphenyl) ether, bis(4-hydroxyphenyl) sulfide, bis(4-hydroxyphenyl) sulfone, bis(3,5-dimethyl-4-hydroxyphenyl) sulfone and 2,2',3,3'-tetrahydro-3,3,3',3'-tetramethyl-1,1'-spirobi[1H-indene]-5,5'-diol or dihydroxydiphenylcycloalkanes of the formula (Ia)

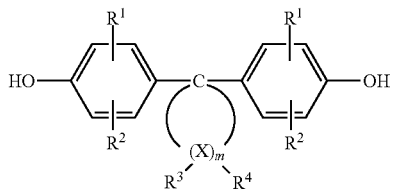

(Ia)

in which $R^1$ and $R^2$ are independently hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, especially benzyl, m is an integer from 4 to 7, preferably 4 or 5, $R^3$ and $R^4$ can be chosen individually for each X and are independently hydrogen or $C_1$-$C_6$-alkyl and X is carbon, with the proviso that, on at least one X atom, $R^3$ and $R^4$ are both alkyl. Preferably, in the formula (Ia), on one or two X atom(s), especially only on one X atom, $R^3$ and $R^4$ are both alkyl.

A preferred alkyl radical for the $R^3$ and $R^4$ radicals in formula (Ia) is methyl. The X atoms in alpha position to the diphenyl-substituted carbon atom (C-1) are preferably non-dialkyl-substituted; by contrast, preference is given to alkyl disubstitution in beta position to C-1. Particularly preferred dihydroxydiphenylcycloalkanes of the formula (Ia) are those having 5 and 6 ring carbon atoms X in the cycloaliphatic radical (m=4 or 5 in formula (Ia)), for example the diphenols of the formulae (Ia-1) to (Ia-3),

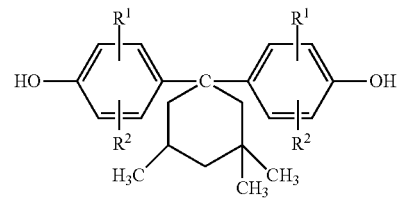

(Ia-1)

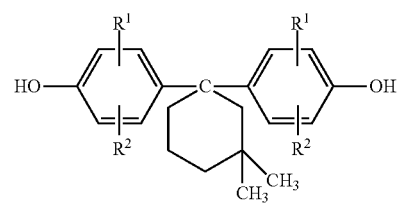

(Ia-2)

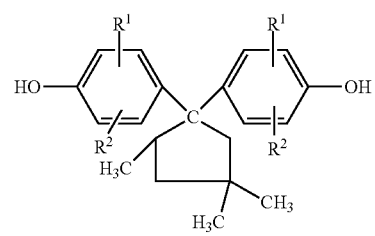

(Ia-3)

A very particularly preferred dihydroxydiphenylcycloalkane of the formula (Ia) is 1,1-bis(4-hydroxyphenyl)-3,3,5-trimethylcyclohexane (formula (Ia-1) with $R^1$ and $R^2$=H).

Polycarbonates of this kind can be prepared according to EP-A 359 953 from dihydroxydiphenylcycloalkanes of the formula (Ia).

Particularly preferred dihydroxyaryl compounds are resorcinol, 4,4'-dihydroxydiphenyl, bis(4-hydroxyphenyl) diphenylmethane, 1,1-bis(4-hydroxyphenyl)-1-phenylethane, bis(4-hydroxyphenyl)-1-(1-naphthyl)ethane, bis(4-hydroxyphenyl)-1-(2-naphthyl)ethane, 2,2-bis(4-hydroxyphenyl)propane, 2,2-bis(3,5-dimethyl-4-hydroxyphenyl)propane, 1,1-bis(4-hydroxyphenyl) cyclohexane, 1,1-bis(3,5-dimethyl-4-hydroxyphenyl) cyclohexane, 1,1-bis(4-hydroxyphenyl)-3,3,5-trimethylcyclohexane, 1,1'-bis(4-hydroxyphenyl)-3-diisopropylbenzene and 1,1'-bis(4-hydroxyphenyl)-4-diisopropylbenzene.

Very particularly preferred dihydroxyaryl compounds are 4,4'-dihydroxydiphenyl and 2,2-bis(4-hydroxyphenyl)propane.

It is possible to use either one dihydroxyaryl compound to form homopolycarbonates or various dihydroxyaryl compounds to form copolycarbonates. It is possible to use either one dihydroxyaryl compound of the formula (I) or (a) to form homopolycarbonates or multiple dihydroxyaryl compounds of the formula (I) and/or (Ia) to form copolycarbonates. The various dihydroxyaryl compounds may be joined to one another either randomly or in blocks. In the case of copolycarbonates formed from dihydroxyaryl compounds of the formula (I) and (Ia), the molar ratio of dihydroxyaryl compounds of the formula (a) to any other dihydroxyaryl compounds of the formula (I) to be used as well is preferably between 99 mol % of (Ia) to 1 mol % of (I) and 2 mol % of (Ia) to 98 mol % of (I), preferably between 99 mol % of (Ia) to 1 mol % of (I) and 10 mol % of (Ia) to 90 mol % of (I), and especially between 99 mol % of (Ia) to 1 mol % of (I) and 30 mol % of (Ia) to 70 mol % of (I).

A very particularly preferred copolycarbonate can be prepared using 1,1-bis(4-hydroxyphenyl)-3,3,5-trimethylcyclohexane and 2,2-bis(4-hydroxyphenyl)propane dihydroxyaryl compounds of the formulae (Ia) and (I).

Suitable carbonic acid derivatives may, for example, be diaryl carbonates of the general formula (II),

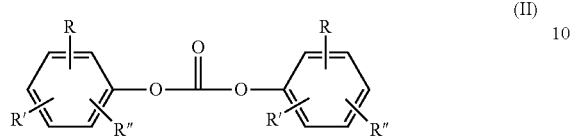

(II)

in which

R, R' and R" are independently the same or different and are hydrogen, linear or branched $C_1$-$C_{34}$-alkyl, $C_7$-$C_{34}$-alkylaryl or $C_6$-$C_{34}$-aryl, R may additionally also be —COO—R''' where R''' is hydrogen, linear or branched $C_1$-$C_{34}$-alkyl, $C_7$-$C_{34}$-alkylaryl or $C_6$-$C_{34}$-aryl.

Preferred diaryl carbonates are for example diphenyl carbonate, methylphenyl phenyl carbonates and di(methylphenyl) carbonates, 4-ethylphenyl phenyl carbonate, di(4-ethylphenyl) carbonate, 4-n-propylphenyl phenyl carbonate, di(4-n-propylphenyl) carbonate, 4-isopropylphenyl phenyl carbonate, di(4-isopropylphenyl) carbonate, 4-n-butylphenyl phenyl carbonate, di(4-n-butylphenyl) carbonate, 4-isobutylphenyl phenyl carbonate, di(4-isobutylphenyl) carbonate, 4-tert-butylphenyl phenyl carbonate, di(4-tert-butylphenyl) carbonate, 4-n-pentylphenyl phenyl carbonate, di(4-n-pentylphenyl) carbonate, 4-n-hexylphenyl phenyl carbonate, di(4-n-hexylphenyl) carbonate, 4 isooctylphenyl phenyl carbonate, di(4-isooctylphenyl) carbonate, 4-n-nonylphenyl phenyl carbonate, di(4-n-nonylphenyl) carbonate, 4-cyclohxylphenyl phenyl carbonate, di(4-cyclohexylphenyl) carbonate, 4-(1-methyl-1-phenylethyl)phenyl phenyl carbonate, di[4-(1-methyl-1-phenylethyl)phenyl] carbonate, biphenyl-4-yl phenyl carbonate, di(biphenyl-4-yl) carbonate, 4-(1-naphthyl)phenyl phenyl carbonate, 4-(2-naphthyl) phenyl phenyl carbonate, di[4-(1-naphthyl)phenyl] carbonate, di[4-(2-naphthyl)phenyl] carbonate, 4-phenoxyphenyl phenyl carbonate, di(4-phenoxyphenyl) carbonate, 3-pentadecylphenyl phenyl carbonate, di(3-pentadecylphenyl) carbonate, 4-tritylphenyl phenyl carbonate, di(4-tritylphenyl) carbonate, (methyl salicylate) phenyl carbonate, di(methyl salicylate) carbonate, (ethyl salicylate) phenyl carbonate, di(ethyl salicylate) carbonate, (n-propyl salicylate) phenyl carbonate, di(n-propyl salicylate) carbonate, (isopropyl salicylate) phenyl carbonate, di(isopropyl salicylate) carbonate, (n-butyl salicylate) phenyl carbonate, di(n-butyl salicylate) carbonate, (isobutyl salicylate) phenyl carbonate, di(isobutyl salicylate) carbonate, (tert-butyl salicylate) phenyl carbonate, di(tert-butyl salicylate) carbonate, di(phenyl salicylate) carbonate and di(benzyl salicylate) carbonate.

Particularly preferred diaryl compounds are diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl) phenyl phenyl carbonate, di[4-(1-methyl-1-phenylethyl) phenyl] carbonate and di(methyl salicylate) carbonate. Very particular preference is given to diphenyl carbonate.

It is possible to use either one diaryl carbonate or various diaryl carbonates.

For control or variation of the end groups, it is additionally possible to use, for example, one or more monohydroxyaryl compound(s) as chain terminators that were not used for preparation of the diaryl carbonate(s) used. These may be those of the general formula (III),

(III)

where $R^A$ is linear or branched $C_1$-$C_{34}$-alkyl, $C_7$-$C_{34}$-alkylaryl, $C_6$-$C_{34}$-aryl or —COO—$R^D$ where $R^D$ is hydrogen, linear or branched $C_1$-$C_{34}$-alkyl, $C_7$-$C_{34}$-alkylaryl or $C_6$-$C_{34}$-aryl, and $R^B$, $R^C$ are independently the same or different and are hydrogen, linear or branched $C_1$-$C_{34}$-alkyl, $C_7$-$C_3$-alkylaryl or $C_6$-$C_{34}$-aryl.

Such monohydroxyaryl compounds are, for example, 1-, 2- or 3-methylphenol, 2,4-dimethylphenol 4-ethylphenol, 4-n-propylphenol, 4-isopropylphenol, 4-n-butylphenol, 4-isobutylphenol, 4-tert-butylphenol, 4-n-pentylphenol, 4-n-hexylphenol, 4-isooctylphenol, 4-n-nonylphenol, 3-pentadecylphenol, 4-cyclohexylphenol, 4-(1-methyl-1-phenylethyl)phenol, 4-phenylphenol, 4-phenoxyphenol, 4-(1-naphthyl)phenol, 4-(2-naphthyl)phenol, 4-tritylphenol, methyl salicylate, ethyl salicylate, n-propyl salicylate, isopropyl salicylate, n-butyl salicylate, isobutyl salicylate, tert-butyl salicylate, phenyl salicylate and benzyl salicylate.

Preference is given to 4-tert-butylphenol, 4-isooctylphenol and 3-pentadecylphenol.

Suitable branching agents may compounds having three and more functional groups, preferably those having three or more hydroxyl groups.

Suitable compounds having three or more phenolic hydroxyl groups are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis(4,4-bis(4-hydroxyphenyl)cyclohexyl]ropane, 2,4-bis(4-hydroxyphenylisopropyl)phenol and tetra(4-hydroxyphenyl)methane.

Other suitable compounds having three and more functional groups are, for example, 2,4-dihydroxybenzoic acid, trimesic acid/trimesoyl chloride, cyanuric trichloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The plastic part containing the abovementioned thermoplastic polymers may be extruded, coextruded, cast, three-dimensionally printed and/or injection molded. The plastic part may also be a three-dimensional plastic part.

It is likewise possible that the plastic part may also be selected from plastic parts comprising a layer construction such as for example films, film layer composites and/or sheets as well as combinations thereof, such as films that have been subjected to film insert molding and contain the polymers described hereinabove. The plastic part is particularly preferably a layer construction which contains at least one layer of a thermoplastic plastic which contains the abovementioned polymers and may be produced by extrusion and/or coextrusion.

The coloring bath may be heated to a temperature up to 99° C. This allows the intensity of the partial coloring to be improved according to the polymer employed in the plastic part. Upon irradiation of the plastic parts in an autoclave the coloring bath may also be heated to 150° C. if this is permitted by the heat distortion resistance of the plastic parts. In a preferred embodiment of the process according to the invention the temperature of the coloring bath is ≤70° C., preferably ≥10° C. to ≤560° C., particularly preferably ≥15° C. to ≤50° C.

The coloring bath may comprise at least one colorant, preferably at least one dye, particularly preferably at least one dye from the group of solvent dyes and/or disperse dyes according to the Colour Index classification or mixtures of these dyes.

The Colour Index (CI) of the Society of Dyers and Colourists and the American Association of Textile Chemists and Colorists unambiguously characterizes all colorants via the group name and the number for the chemical composition/chemical structure.

Colorants from the group of solvent dyes according to the Colour Index classification may be for example the so-called Macrolex™ colorants from Lanxess AG, Germany. Examples include Macrolex™ Blue 3R, Macrolex™ Red H, Macrolex™ Yellow 60 (Solvent Yellow 179 according to CI), Macrolex™ Violet Red R (Disperse Violet 31 according to CI), Macrolex™ Orange R (Solvent Orange 107 according to CI) or mixtures of these dyes.

Dyes from the group of the disperse dyes according to the Colour Index classification may be for example diazo-, diphenylamine and anthraquinones compounds, acetate dyes, dispersion dyes and/or dispersol dyes and include disperse blue #3, disperse blue #14, disperse yellow #3, disperse red #134 and disperse red #7. The classification and description of the abovementioned dyes is in accordance with "The Colour Index". 3rd edition, joint publication of the Society of Dyes and Colors and the American Association of Textile Chemists and Colorists (1971). Very generally the dyes may be employed either as a single dye constituent or as a component of a mixture according to the desired color. Thus the employed term "dye" also encompasses dye mixtures.

Suitable dyes include water-insoluble diazo-diphenylamine and anthraquinone compounds. Particularly suitable are acetate dyes, dispersed acetate dyes, dispersion dyes and dispersol dyes, as disclosed in the Colour Index, $3^{rd}$ edition, volume 2, The Society of Dyers and Colourists, 1971, p. 2479 and 2187-2743.

The preferred dispersed dyes include Dystar's Palanil™ Blue E-R150 (anthraquinone/disperse blue), DIANIX™ Orange E-3RN (azo dye/CI disperse-Orange 25) and the abovementioned Macrolexm dyes as solvent dyes.

In one embodiment the coloring bath comprises:
a) solvent and/or dispersant, preferably water and/or organic solvent, particularly preferably water
b) at least one colorant, preferably at least one dye, particularly preferably at least one dye from the group of solvent dyes and/or disperse dyes according to the Colour Index classification or a mixture of these dyes.

Coloring baths of this kind suitable for uniform coloring of polycarbonate plastic parts at temperatures >80° C. have proven advantageous. These are described for example in WO-A 03/040461, EP-A 2050866, WO-A 03/083207. Under the conditions of the process according to the invention a partial coloring of the plastic part takes place substantially at the irradiated regions so that an intensive engraving becomes visible precisely at these sites.

In a further embodiment of the invention the coloring bath therefore comprises in addition to the abovementioned components a) and b)
c) at least one further solvent of structural formula (I)

in which R is an ethyl, propyl or butyl radical,
m is 2, 3 or 4 and
n is 1, 2 or 3,
with the proviso that when R is butyl, m is 2 or 4,
d) at least one leveling agent of structural formula (II):

in which m is 2, 3 or 4 and
n is 1, 2 or 3.

The components a) to d) may be present in the following amounts based on the total weight of the coloring bath:
a) 5.0% to 99.99% by weight, preferably 62.5% to 90.0% by weight, particularly preferably 65.0% to 85.0% by weight,
b) 0.01% to 15.0% by weight, preferably 0.1% to 5.0% by weight, particularly preferably 0.2% to 4.0% by weight,
c) 0% to 35.0% by weight, preferably 1.0% to 30.0% by weight, particularly preferably 5.0% to 25.0% by weight.
d) 0% to 30.0% by weight, preferably 1.0% to 20.0% by weight, particularly preferably 3.0% to 15.0% by weight.

In a further embodiment of the process according to the invention the coloring bath comprises a colorant and/or a colorant mixture selected from the group of the disperse dyes according to the Colour Index classification, very particularly a dye selected from the group consisting of azo-, diphenylamine and anthraquinone compounds.

In another preferred embodiment of the process according to the invention the coloring bath comprises a colorant and/or a colorant mixture selected from the group of the solvent dyes according to the Colour Index classification, very particularly preferably a dye and/or dye mixture of the Makrolex™ dyes.

The solvent and/or dispersant a) employed may be water and/or organic solvent. It is preferred to employ water.

Suitable organic solvents include any commonly used solvents that did not attack the plastic part on contact. Examples include butyl alcohol, butylene glycol, diethylene glycol, ethyl alcohol, ethylene glycol, heptane, hexane, pentane, propargyl alcohol, propyl alcohol or mixtures of the abovementioned solvents.

It is preferable to employ water and a compound of component c) in the process according to the invention.

The irradiation of the plastic part in step iii) is carried out with a focused nonionizing electromagnetic radiation, wherein the wavelength range of the focused nonionizing electromagnetic radiation is chosen such that the coloring bath has a light permeability of ≥10% to ≤99, preferably of ≥30% to ≤95%, particularly preferably ≥40% to ≤93%, determined according to ISO 13468-2.

In an advantageous embodiment of the invention the irradiation in step iii) is carried out with laser radiation, wherein the coloring bath has a light permeability of ≥10% to ≤99%, preferably of ≥30% to ≤95%, particularly preferably ≥40% to ≤93%, determined according to ISO 13468-2. The laser radiation preferably has a wavelength in the range from ≥0.70 μm to ≤1000 μm, preferably in the range from ≥1.0 μm to ≤50 μm, particularly preferably in the range from ≥1.0 μm to ≤2.5 μm.

Provided that the irradiation is carried out with the laser it may be carried out in continuous wave operation (CW laser). It is particularly preferable to employ pulsed laser radiation for the irradiation of the plastic parts. A pulse duration of the laser of fractions of seconds is sufficient to achieve a coloring of the plastic part at the laser-irradiated sites. It is preferable to employ pulse durations of $10^{-18}$ to $10^{-1}$ seconds, particularly preferably pulse durations of $10^{-9}$ to $10^{-2}$ seconds, very particularly preferably pulse durations of $10^{-6}$ to $10^{-3}$ seconds.

Varying the power of the employed laser beam for the irradiation in step iii) makes it possible to influence the intensity of the coloring at the lasered sites according to the requirements of the desired application. The higher the employed laser power the more intensive the coloring at the lasered sites of the plastic part. The intermediate power range of a 7.5 watt marking laser achieves color engravings of sufficient quality. Significantly higher powers and thus also more intensive colorings in the plastic part can be achieved in pulsed operation.

It is preferable to employ NdYAG lasers (neodymium-doped yttrium-aluminum-garnet lasers) in the process according to the invention. The shorter the pulses the higher the peak pulse power. At pulse durations of 15 ns to 400 ns pulse peaks of 100 kJ are achievable.

In the process according to the invention the plastic part comprises at least one additive which has an absorption maximum in the wavelength range of the employed focused nonionizing electromagnetic radiation or the plastic part may be coated with at least one additive which has an absorption maximum in the wavelength range of the employed focused nonionizing electromagnetic radiation.

Suitable additives include in principle all laser-sensitive additives, so-called laser marking additives, i.e. additives composed of an absorber in the wavelength range of the laser to be used.

The additive preferably comprises at least one or more organic and/or inorganic IR absorbers, preferably inorganic IR absorbers. Such additives and the use thereof in molding compounds are described for example in WO-A 2004/50766 and WO-A 2004/50767 and are commercially available from DSM under the brand name Micabs™.

Suitable organic IR absorbers are for example compounds having the highest possible absorption between 700 and 2500 nm (near-infrared=NIR). Suitable infrared absorbers include for example those known from the literature as described by substance class for example in M. Matsuoka, Infrared Absorbing Dyes, Plenum Press, New York, 1990. Particularly suitable are infrared absorbers from the substance classes comprising the azo, azomethine, methine, anthraquinone, indanthrone, pyranthrone, flavanthrone, benzanthrone, phthalocyanine, perylene, dioxazine, thioindigo, isoindoline, isoindolinone, quinacridone, pyrrolopyrrole or quinophthalone pigments as well as metal complexes of azo, azomethine or methine dyes or metal salts of azo compounds. Among these, phthalocyanines and naphthalocyanines are very particularly suitable. On account of their improved solubility in thermoplastic plastics phthalocyanines and naphthalocyanines having bulky side groups are preferable.

Suitable inorganic IR absorbers are for example mixed oxides of metals such as for example phosphorus-containing tin-copper mixed oxides, as described in WO-A 2006/042714 for example, those from the group of borides and/or tungstates and mixtures thereof, preferably at least one or more IR absorbers from the group of borides and/or tungstates and mixtures thereof, particularly preferably at least one or more IR absorbers from the group of tungstates.

Suitable inorganic IR absorbers from the group of borides include for example compounds of the type MB (M=La, Ce, Pr, Nd, Tb, Dy, Ho, Y, Sm, Eu, Er, Tm, Yb, Lu, Sr, Ti, Zr, Hf, V, Ta, Cr, Mo, W and Ca; and x and y are integers from 1 to 6) such as lanthanum hexaboride ($LaB_6$), praseodymium boride ($PrB_6$), neodymium boride ($NdBb_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride ($CrB$ and $CrB_2$), molybdenum boride ($MoB_2$, $Mo_2B_5$ and $MoB$), tungsten boride ($W_2B_5$) or combinations thereof.

Suitable inorganic IR absorbers from the group of tungstates also include for example those from the group of tungsten compounds of the type $W_yO_z$ (W=tungsten, O=oxygen; z/y=2.20-2.99) and/or $M_xW_yO_z$ (M=H, He, alkali metal, alkaline earth metal, metal from the group of the rare earths, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi; x/y=0.001-1.000; z/y=2.2-3.0), wherein elements preferred as M are H, Cs, Rb, K, Tl, In, Ba, Li, Ca, Sr, Fe and Sn, among which very particular preference is given to Cs. Particular preference is given to $Ba_{0.3}WO_3$, $Tl_{0.33}WO_3$, $K_{0.33}WO_3$, $Rb_{0.33}WO_3$, $Cs_{0.33}WO_3$, $Na_{0.33}WO_3$, $Na_{0.75}WO_3$ and mixtures thereof. In a particular embodiment of the present invention, the sole use of $Cs_{0.33}WO_3$ as inorganic IR absorber is very particularly preferred. Likewise preferred are Cs/W ratios of 0.20 and 0.25.

Among the inorganic IR absorbers the tungstates are preferable over the borides on account of their low intrinsic coloring provided that the process according to the invention is to be carried out on plastic parts having a light permeability of ≥10% to ≤99%, preferably of ≥30% to ≤95%, particularly preferably ≥40% to ≤93%, determined according to ISO 13468-2.

To prepare such tungstates tungsten trioxide, tungsten dioxide, a hydrate of a tungsten oxide, tungsten hexachloride, ammonium tungstate or tungstic acid for example and optionally further salts containing the element M, for example cesium carbonate, are mixed in certain stoichiometric ratios so that the molar ratios of the individual components are given by the formula $M_xW_yO_z$. This mixture is subsequently treated in a reducing atmosphere, for example an argon/hydrogen atmosphere, at temperatures between 100° C. and 850° C. and finally the obtained powder is heat-treated in an inert gas atmosphere at temperatures between 550° C. and 1200° C. To produce the inorganic IR absorber nanoparticles according to the invention the IR absorber may be mixed with the dispersants described hereinbelow and further organic solvents, for example toluene, benzene or similar aromatic hydrocarbons, and ground in suitable mills, for example ball mills, with addition of zirconium oxide (for example having a diameter of 0.3 mm) to produce the desired particle size distribution. The nanoparticles are obtained in the form of a dispersion. After grinding, it is optionally possible to add further dispersants. The solvent is removed at elevated temperatures and reduced pressure. Preference is given to nanoparticles having an average size smaller than 200 nm, particularly preferably smaller than 100 nm. The size of the particles can be determined with the aid of transmission electron microscopy (TEM). Measurements of this kind on IR absorber nanoparticles are described, for example, in Adachi et al., J. Am. Ceram. Soc. 2008, 91, 2897-2902.

Preparation of the tungstates according to the invention is more particularly described for example in EP 1 801 815 A1 and said tungstates are commercially available for example from Sumitomo Metal Mining Co., Ltd. (Japan) under the designation YMDS 874.

For use in transparent thermoplastics having a light permeability of ≥10% to ≤99%, preferably of ≥30% to ≤95%, particularly preferably ≥40% to ≤93% determined according to ISO 13468-2, the thus obtained particles are dispersed in an organic matrix, for example in an acrylate, and optionally ground as described hereinabove in a mill using suitable auxiliaries, for example zirconium dioxide, and optionally using organic solvents, for example toluene, benzene or similar hydrocarbons.

Suitable polymer-based dispersants are in particular dispersants that have high light transmittance, for example polyacrylates, polyurethanes, polyethers, polyesters or polyesterurethanes and polymers derived therefrom.

Preferred dispersants are polyacrylates, polyethers and polyester-based polymers, and particularly preferred dispersants of high thermal stability are polyacrylates, for example polymethylmethacrylate, and polyesters. It is also possible to use mixtures of these polymers or else copolymers based on acrylate. Dispersing auxiliaries of this kind and methods for production of tungstate dispersions are described, for example, in JP 2008214596 and in Adachi et al. J. Am. Ceram. Soc. 2007, 90 4059-4061. Dispersants suitable for the present invention are commercially available.

Polyacrylate-based dispersants are suitable in particular. Such suitable dispersants are obtainable for example from Ciba Specialty Chemicals under the trade names EFKA™, for example EFKA™ 4500 and EFKA™ 4530. Polyester-containing dispersants are likewise suitable. They are obtainable for example from Avecia under the trade name Solsperse™, for example Solsperse™ 22000, 24000SC, 26000, 27000. Polyether-containing dispersants are also known for example under the trade names Disparlon™ DA234 and DA325 of Kusumoto Chemicals. Polyurethane-based systems are also suitable. Polyurethane-based systems are obtainable from Ciba Specialty Chemicals under the trade name EFKA™ 4046, EFKA™ 4047. Texaphor™ P60 and P63 are corresponding trade names of Cognis.

The amount of the IR absorber in the dispersant is 0.2% by weight to 50.0% by weight, preferably 1.0%-40.0% by weight, more preferably 5.0%-35% by weight and most preferably 10.0%-30% by weight based on the dispersion of the inorganic IR absorber employed according to the invention. The overall composition of the ready-to-use IR absorber formulation may include not only the pure IR absorber material and the dispersant but also further auxiliaries such as for example zirconium dioxide, and residual solvents, for example toluene, benzene or similar aromatic hydrocarbons.

There am no limitations whatsoever to the amount of the inorganic IR absorbers according to the invention, particularly preferably those from the group of tungstates, in the inventive polymer compositions of the plastic parts. However, the inorganic IR absorbers, in particular the tungstates, may typically be employed in an amount of ≥0.7% by weight to ≤4.5% by weight, preferably ≥0.6% by weight to ≤2% by weight and particularly preferably ≥0.7% by weight to ≤1.5% by weight calculated as the solids fraction of inorganic IR absorber in the total polymer composition.

In the present context the term solids fraction of inorganic IR absorber, in particular tungstate, is to be understood as meaning the inorganic IR absorber, in particular the tungstate, as a pure substance and not as a dispersion, suspension or other preparation containing the pure substance, wherein the contents of R additive, in particular the tungstate content, reported below always relate to this solids fraction unless explicitly otherwise stated.

In a further embodiment further IR absorbers may optionally be employed in addition to the tungstates IR absorbers, wherein the proportion/amount thereof in such a mixture is always below that of the above described tungstates. In the case of mixtures, preference is given to compositions containing two to five (inclusive) and particularly preferably two or three different IR absorbers. The further IR absorbers are preferably selected from the group of borides and tin oxides, particularly preferably $LaB_6$ or antimony-doped tin oxide or indium tin oxide.

Such mixtures of IR absorbers predominantly occur in applications where intrinsic coloring of the component up to a Delta E of 20, preferably up to a Delta E of 15, relative to the plastic part without IR absorbers is acceptable.

In an alternative embodiment of the invention the plastic part may be coated with an additive in the form of a coating composition which has an absorption maximum in the wavelength range of the employed focused nonionizing electromagnetic radiation. These coating compositions preferably comprise an IR absorber which absorb in the wavelength range from ≥0.70 μm to ≤1000 μm, preferably in the range from ≥1.0 μm to ≤50 μm, particularly preferably in the range from ≥1.0 μm to ≤2.5 μm. These coating compositions are commercially available for example as Clearweld™ under the designation LD920, LD930 or LD940.

According to the invention the at least one additive which has an absorption maximum in the wavelength range of the employed focused nonionizing electromagnetic radiation is in the plastics part.

In the process according to the invention the immersion depth of the plastic part in the coloring bath in step i) can influence the intensity of the coloring after the irradiation in step iii). In the context of the present invention immersion depth is to be understood as meaning the penetration depth of the employed radiation into the coloring bath up to the surface of the plastic part onto which the partial coloring is to be applied. Overall the immersion depth should not be too deep since the intensity of the employed radiation decreases the greater the penetration depth of the employed radiation into the coloring bath up to the plastic surface. In one embodiment the immersion depth of the plastic part in the coloring bath in step i) is ideally ≤120 mm, preferably 0.01 to 100 mm, particularly preferably 0.1 to 20 mm and very particularly preferably 0.1 to 5.0 mm.

Provided that the surface of the plastic part is specially pretreated to increase the surface energy, for example by plasma treatment, corona treatment, flame treatment or chemical treatment of the plastic parts, even lower immersion depths of the plastic part in step i) may be achieved. For example improved wetting of the plastic surface by the coloring bath makes it possible to use an immersion depth of only 0.015 mm.

The color concentration of the coloring bath may also influence the intensity of the partial coloring of the plastic part after irradiation. A concentration of dye b) is preferably 0.01% to 15.0% by weight, particularly preferably 0.1% to 5.0% by weight, very particularly preferably 0.2% to 4.0% by weight based on the total weight of the coloring bath.

One embodiment of the process according to the invention employs a molding made of plastic which is produced in an injection molding apparatus according to known processes such as for example in-mold decoration (IMD), film insert molding (FIM) or high pressure forming (HPF).

To avoid repetition the following embodiments of the plastic part employable in the process according to the invention refer to the preceding embodiments in respect of the material, composition of the thermoplastic plastic and of the additive and also to the embodiments of the process per se.

In one advantageous embodiment of the invention the plastic part comprises at least one layer of a thermoplastic plastic, wherein this at least one layer of a thermoplastic plastic comprises at least one additive which has an absorption maximum in the wavelength range of the employed focused nonionizing electromagnetic radiation or wherein the plastic part is coated with at least one additive in the form of a coating composition which has an absorption maximum in the wavelength range of the employed focused nonionizing electromagnetic radiation. This at least one layer of a thermoplastic plastic preferably forms an outer layer of the plastic part. In this embodiment this at least one layer of a thermoplastic plastic is particularly preferably a layer of a thermoplastic plastic having a light permeability of ≥10% to ≤99%, preferably of ≥30% to ≤95%, particularly preferably ≥40% to ≤93% determined according to ISO 13468-2.

In another embodiment the plastic part is a layer construction, wherein this layer construction comprises at least one layer of a thermoplastic plastic ("layer a)"), wherein this at least one layer a) forms at least one outer layer of the layer construction and comprises at least one additive which has an absorption maximum in the wavelength range of the employed focused nonionizing electromagnetic radiation or wherein this layer construction comprises at least one layer of a thermoplastic plastic ("layer a')"), wherein this at least one layer a') forms at least one outer layer of the layer construction and this outer layer a') is coated with at least one additive in the form of a coating composition which has an absorption maximum in the wavelength range of the employed focused nonionizing electromagnetic radiation.

In a further embodiment the plastic part is a layer construction, wherein this layer construction comprises at least one layer of a thermoplastic plastic ("layer a)"), wherein this at least one layer a) forms at least one outer layer of the layer construction and comprises at least one additive which has an absorption maximum in the wavelength range of the employed focused nonionizing electromagnetic radiation, and comprises at least one further layer of a thermoplastic plastic ("layer b)").

In another embodiment the plastic part is a layer construction, wherein this layer construction comprises at least one layer of a thermoplastic plastic ("layer a)"), wherein this at least one layer a) forms at least one outer layer of the layer construction and comprises at least one additive which has an absorption maximum in the wavelength range of the employed focused nonionizing electromagnetic radiation and wherein this layer construction comprises at least one further layer of a thermoplastic plastic ("layer b)") and wherein this layer construction comprises at least one further layer a), this at least one further layer a) comprises at least one additive which has an absorption maximum in the wavelength range of the employed focused nonionizing electromagnetic radiation and wherein the two layers a) each constitute an outer layer of the layer construction.

The above described embodiments of the invention may further comprise at least one black pigment, preferably carbon black. It is preferable when the at least one black pigment, preferably carbon black, is present in the layer a) or layer a') and/or in the layer b). It is particularly preferable when the at least one black pigment, preferably carbon black, is present in the layer b). The at least one black pigment, preferably carbon black, is preferably present in an amount of 5 to 100 ppm, preferably of 9 to 50 ppm, very particularly preferably of 10 to 40 ppm.

The embodiments which additionally contain at least one black pigment, preferably carbon black, are suitable for laser engraving in black and white, in particular for personalized laser engraving of security documents and very particularly of identification documents. Layer constructions suitable for laser engraving in black and white are known from WO-A 2010/089035 for example. Provided that a black and white laser engraving is to be carried out in addition to the color laser engraving according to the invention the black-and-white laser engraving is carried out in the absence of the coloring bath.

In a further embodiment the plastic part is a layer construction, wherein this layer construction comprises at least one layer of a thermoplastic plastic ("layer a)"), wherein this at least one layer a) forms at least one outer layer of the layer construction and comprises at least one additive which has an absorption maximum in the wavelength range of the employed focused nonionizing electromagnetic radiation and wherein this layer construction comprises at least one further layer of a thermoplastic plastic ("layer b)") comprising at least one black pigment, preferably carbon black, and wherein the at least one layer a) has a layer thickness of 5 to 30 μm, preferably 8 to 25 μm. In this embodiment the layer b) preferably comprises a layer thickness of 30 μm to 375 μm, particularly preferably of 50 μm to 250 μm and very particularly preferably of 75 μm to 200 μm and particularly preferably comprises the black pigment, preferably carbon black, in an amount of 5 to 180 ppm, preferably of 5 to 100 ppm.

In another embodiment the layer construction as described in the preceding embodiments may additionally comprise at least one filler. The filler is preferably at least one color pigment and/or at least one other filler for producing a translucence of the filled layers, particularly preferably a white pigment, very particularly preferably titanium dioxide, zirconium dioxide or barium sulfate, in a preferred embodiment titanium dioxide.

In the preceding embodiments this filler may preferably be present either in the layer b) or else in a further layer of a thermoplastic plastic ("layer c)").

The filling of a layer containing at least one thermoplastic plastic with at least one such filler improves the visibility of the incorporated script/image(s), thus also further improving the perception of improved sharpness and resolution. This layer construction is known from WO-A 2010/089035 and is described in detail therein.

The abovementioned layer constructions make it possible to combine the color laser engraving according to the invention with the black laser engraving. To this end, before or after the color laser engraving according to the invention the plastic part comprising one of the above described layer constructions is irradiated with the same laser beam in the absence of the coloring bath to apply the black engraving onto the surface of the layer construction at the desired site. In the case of laser engraving outside the coloring bath the high laser reactivity of these layer constructions results in a blackening at the laser-irradiated sites.

The invention further provides plastic articles, in particular security and/or high-value documents, very particularly identification documents, obtainable by the process according to the invention.

The invention further provides for the use of an additive which has an absorption maximum in the wavelength range of the employed focused nonionizing electromagnetic radiation for production of color laser engraved plastic parts, preferably of color laser engraved layer constructions, particularly preferably of color laser engraved security documents, by the process according to the invention.

EXAMPLES

I. Composition of the Coloring Bath
69.31% by weight of water
0.99% by weight of Macrolex™ Blue 3R (colorant, from Lanxess AG Deutschland)
19.8% by weight of ethylene glycol butyl ether (EGBE), (solvent, The Dow Chemical Company)
9.9% by weight of diethylene glycol (DEG), (leveling agent, Merck KGaA)

II. Process for Color Laser Engraving

Laser irradiation was carried out using a Foba D84 NdYAG laser having a laser power of about 7.5 W, a laser frequency of 8 kHz in pulsed operation and a current of 8 A. The advance rate of the laser, the immersion depth and the temperature of the coloring bath for the examples which follow are reported in table 1.

The films/the molding of the examples 1 to 3 were immersed in the coloring bath according to the specifications in table 1. The coloring bath comprising the film/the molding was placed on the workpiece carrier of a Foba D84S laser apparatus. The focus of the laser was tuned to the film surface. The immersion depth is reported in table 1. In the context of the present invention immersion depth is to be understood as meaning the penetration depth of the employed radiation into the coloring bath up to the surface of the plastic part onto which the partial coloring is to be applied. Irradiation with the laser beam was commenced.

TABLE 1

| Conditions of the color laser engraving | | | |
|---|---|---|---|
| | Example 1 (V) | Example 2 | Example 3 |
| Temperature of coloring bath | 40° C. | 40° C. | 40° C. |
| Immersion depth | 1 mm | 1 mm | 1 mm |
| Advancing rate | 100 mm/s | 100 mm/s | 100 mm/s |

(V): Comparative example

Example 1—Comparison

A plastics film Makrofol™ ID 4-4 opaque white made of polycarbonate and having a thickness of 200 μm from Covestro Deutschland AG was colored as described above under II.

After removal of the plastic part from the coloring bath a blue coloring had formed in the path of the laser on the film. The regions of the film not irradiated with the laser were not significantly colored.

Example 2—Inventive

A plastic film composite composed of two different polycarbonate films (film (a-1) and film (a-2)) was colored as described above under II.
Film (a-1): Makrofol™ ID4-4 opaque white made of polycarbonate in a thickness of 300 μm from Covestro Deutschland AG.
Production of film (a-2): Transparent polycarbonate film in a thickness of 100 μm.

Masterbatch: Compounding of a Highly Concentrated IR Masterbatch

The production of the masterbatch for the production of the film (a-2) was carried out with a conventional twin-screw compounding extruder (ZSK 32) at processing temperatures customary for polycarbonate of 250° C. to 330° C.

A masterbatch having the following composition was compounded and subsequently granulated:
94.69% by weight of polycarbonate Makrolon™ 3108 from Covestro Deutschland AG
0.75% by weight of YMDS 874 IR absorber from Sumitomo
4.5% by weight of Makrolon™ 3108 powder from Covestro Deutschland AG
0.006% by weight (60 ppm) lamp black 101 (carbon black from Evonik-Degussa GmbH) having an average particle size of 95 nm Production of Extrusion Film (a-2)

The employed apparatus for producing the extruded film comprises:
an extruder for extrusion of the layer containing at least one polycarbonate or with a screw of 60 mm in diameter (D) and a length of 33 D. The screw has a degassing zone;
melt pump;
crosshead;
slot die of 450 mm in width;
three-roller smoothing calender with horizontal roller orientation, wherein the third roller can swivel by +1-45 relative to the horizontal;
roller conveyor;
thickness measuring means
means for double-sided application of protective film;
takeoff means;
winding station.

The granulate of the masterbatch was conveyed from the dryer into the filling hopper of the extruder. The material was melted and conveyed in the barrel/screw plasticizing system of the extruder. The melt passed from the slot die on to the smoothing calendar. The final shaping and cooling of the film was carried out on the smoothing calendar (consisting of three rollers). The surfaces were embossed using a textured steel roller (no. 6 side) and a textured silicone rubber roller (no. 2 side). The rubber roller used for texturing the film surface is described in U.S. Pat. No. 4,368,240 from Nauta Roll Corporation. The film was subsequently transported through a takeoff and then the film was wound up.

Lamination of Films (a-1) and (a-2)

Lamination was carried out on a Bürckle 50/100 lamination press. The films (a-1) and (a-2) were laminated with the following press settings:
Heating zone: temperature 190° C., duration 8 minutes, pressure 60 N/cm²
Cooling zone: temperature 38° C., duration 10 minutes, pressure 100 N/cm²

After removal of the plastic film composite from the coloring bath an intensive blue coloring had formed in the path of the laser on the film. The regions of the film not irradiated with the laser were not significantly colored.

Example 3—Inventive

The plastic part to be colored is a multilayered three-dimensionally molded plastic part produced by film insert molding (FIM) technology. The film composite from example 2 was molded in a three-dimensional mold by high-pressure molding. Forming was carried out on a Niebling HPF forming apparatus. The three-dimensionally formed film composite was placed in a plastic injection mold and subjected to film insert molding with Bayblend™ T65 from Covestro Deutschland AG on the white side of the film composite.

The thus-produced molding was colored as described under 11.

After removal of the plastic part from the coloring bath an intensive blue coloring had formed in the path of the laser on the film insert molded plastic part. The regions of the plastic part not irradiated with the laser were not significantly colored.

The coloring in the path of the laser in inventive examples 2 and 3 was more intensive compared to example 1 where no IR absorber was present in the film.

The invention claimed is:

1. A process for partial coloring of plastic parts containing the steps of
    i) immersing a plastic part in a coloring bath,
    ii) optionally heating the coloring bath,
    iii) irradiating the plastic part from i) and optionally ii) with focused nonionizing electromagnetic radiation,
    wherein the partial coloring is effected substantially only at a site irradiated in step iii); wherein a wavelength range of the focused nonionizing electromagnetic radiation is chosen such that the coloring bath has a light permeability of ≥10% to ≤99%, determined according to ISO 13468-2;
    wherein the plastic part comprises at least one additive which has an absorption maximum in the wavelength range of the focused nonionizing electromagnetic radiation or wherein the plastic part is coated with at least one additive comprising a coating composition which has an absorption maximum in the wavelength range of the focused nonionizing electromagnetic radiation.

2. The process as claimed in claim 1, wherein the plastic part contains a thermoplastic plastic.

3. The process as claimed in claim 1, wherein step iii) is carried out using laser radiation having a wavelength range of from ≥0.70 μm to ≤1000 μm.

4. The process as claimed in claim 1, wherein the additive comprises at least one or more organic and/or inorganic IR absorbers.

5. The process as claimed in claim 1, wherein the additive comprises at least one or more inorganic IR absorbers selected from the group consisting of borides, tungstates, and mixtures thereof.

6. The process as claimed in claim 1, wherein the coloring bath comprises at least one colorant.

7. The process as claimed in claim 1, wherein the coloring bath comprises at least one dye selected from the group consisting of solvent dyes, disperse dyes, and mixtures thereof.

8. The process as claimed in claim 1, wherein an immersion depth of the plastic part in step i) is ≤120 mm.

9. The process as claimed in claim 1, wherein the coloring bath comprises:
    a) solvent and/or dispersant, and
    b) at least one colorant.

10. The process as claimed in claim 1, wherein steps i) to iii) are preceded or followed by an irradiation with focused nonionizing electromagnetic radiation as in step iii).

11. The process as claimed in claim 1, wherein the plastic part has a layer construction, wherein the layer construction comprises at least one layer of a thermoplastic plastic, wherein the at least one thermoplastic plastic forms at least one outer layer of the layer construction and comprises at least one additive which has an absorption maximum in the wavelength range of the employed focused nonionizing electromagnetic radiation or, wherein the at least one thermoplastic plastic forms at least one outer layer of the layer construction and the outer thermoplastic plastic is coated with at least one additive in the form of a coating composition which has an absorption maximum in the wavelength range of the employed focused nonionizing electromagnetic radiation.

12. The process as claimed in claim 1, wherein the plastic part has a layer construction, wherein the layer construction comprises at least one layer of a thermoplastic plastic, wherein the at least one thermoplastic plastic forms at least one outer layer of the layer construction and comprises at least one additive which has an absorption maximum in the wavelength range of the employed focused nonionizing electromagnetic radiation, and comprises at least one further layer of a thermoplastic plastic.

13. The process as claimed in claim 12, wherein at least one layer of a thermoplastic plastic or the at least one further layer of a thermoplastic plastic additionally contains at least one black pigment.

14. The process as claimed in claim 12, wherein the at least one further layer of a thermoplastic plastic additionally contains at least one black pigment.

15. A security document obtainable by the process as claimed in claim 1.

16. A method comprising utilizing an additive having an absorption in the wavelength range of the employed focused nonionizing electromagnetic radiation for production of color laser engraved plastic parts by the process as claimed in claim 1.

* * * * *